(12) United States Patent
Falde et al.

(10) Patent No.: US 10,661,373 B2
(45) Date of Patent: May 26, 2020

(54) SYSTEMS AND METHODS FOR PROVIDING WELD QUALITY CONFIDENCE

(71) Applicant: Illinois Tool Works Inc., Glenview, IL (US)

(72) Inventors: Leland D. Falde, Jackson, MI (US); Stephen P. Ivkovich, East Lansing, MI (US); Vincent N. Romano, Pinckney, MI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 746 days.

(21) Appl. No.: 15/264,013

(22) Filed: Sep. 13, 2016

(65) Prior Publication Data

US 2017/0072496 A1 Mar. 16, 2017

Related U.S. Application Data

(60) Provisional application No. 62/218,504, filed on Sep. 14, 2015.

(51) Int. Cl.
*B23K 9/095* (2006.01)
*B23K 9/10* (2006.01)
(Continued)

(52) U.S. Cl.
CPC .......... *B23K 9/0953* (2013.01); *B23K 9/1062* (2013.01); *B23K 31/125* (2013.01); *G08B 5/223* (2013.01)

(58) Field of Classification Search
CPC .. B23K 9/0953; B23K 9/1062; B23K 31/125; G08B 5/223
See application file for complete search history.

(56) References Cited

U.S. PATENT DOCUMENTS

| 4,375,026 A | 2/1983 | Kearney |
| 5,714,734 A | 2/1998 | Peterson |

(Continued)

FOREIGN PATENT DOCUMENTS

| CN | 102528227 | 7/2012 |
| CN | 102596476 | 7/2012 |

(Continued)

OTHER PUBLICATIONS

PCT, Notification Concerning Transmittal of the International Preliminary Report on Patentability, in Application No. PCT/US2016/051585, dated Mar. 29, 2018 (8 pages).

(Continued)

*Primary Examiner* — Christopher S Kim
(74) *Attorney, Agent, or Firm* — McAndrews, Held & Malloy, Ltd.

(57) ABSTRACT

Systems and methods for welding are described. The welding system can include, for example, a welding power source, a welding torch, and a computer. The computer and the welding torch can be operatively coupled to the power source. A first weld is performed and its signature is saved by the computer. It is considered a high quality weld and is selected as a weld reference. A second weld is performed and its signature is saved by the computer. The computer then computes a single weld confidence result for the second weld based on a comparison between the signature data of the second weld and the signature data of the reference weld. A weld fault condition is triggered based on the single weld confidence result which causes the welding system to stop or to modify the welding operation, and/or which causes the welding system to send out communications relating to the triggering of the weld fault condition.

22 Claims, 4 Drawing Sheets

(51) Int. Cl.
    *G08B 5/22* (2006.01)
    *B23K 31/12* (2006.01)

(56) References Cited

U.S. PATENT DOCUMENTS

| | | | |
|---|---|---|---|
| 5,756,967 | A | 5/1998 | Quinn |
| 6,583,386 | B1 | 6/2003 | Ivkovich |
| 2009/0173726 | A1 | 7/2009 | Davidson |
| 2014/0131320 | A1 | 5/2014 | Hearn |
| 2018/0178320 | A1* | 6/2018 | Webster ............... B23K 26/032 |

FOREIGN PATENT DOCUMENTS

| | | |
|---|---|---|
| CN | 102922089 A | 2/2013 |
| CN | 103331506 | 10/2013 |
| CN | 103862135 | 6/2014 |
| CN | 103909325 | 7/2014 |
| CN | 104379291 | 2/2015 |
| CN | 104551372 | 4/2015 |
| WO | 2014149786 A1 | 9/2014 |

OTHER PUBLICATIONS

PCT, Notification of Transmittal of the International Search Report and the Written Opinion of the International Searching Authority, or the Declaration, in International application No. PCT/US2016/051579, dated Jan. 10, 2017 (12 pages).

PCT, Notification of Transmittal of the International Search Report and the Written Opinion of the International Searching Authority, or the Declaration, in Application No. PCT/US2016/051585, dated Dec. 21, 2016 (12 pages).

Canadian Office Action Appln No. 2,996,182 dated Nov. 5, 2019 (5 pgs.).

\* cited by examiner

SYSTEMS AND METHODS FOR PROVIDING WELD QUALITY CONFIDENCE

RELATED APPLICATIONS

The present application claims priority to and benefit from U.S. Application No. 62/218,504, filed Sep. 14, 2015. The above-identified application is hereby incorporated by reference herein in its entirety.

BACKGROUND

There are many causes for weld quality variations. It is difficult to monitor weld quality and to provide a metric for weld confidence especially since there are many different factors that can affect a weld that weld confidence metrics do not take into consideration such as, for example, weld locations on a part, the significance of some welds compared to others, and real-world conditions and/or environments.

What is needed are systems and methods of weld systems that can assign weld confidence metrics to welding operations under real-world conditions and/or other practical considerations.

BRIEF SUMMARY

Methods and systems of welding are provided that can assign weld confidence metrics to weld operations under real-world conditions and/or other practical considerations substantially as illustrated by and/or described in connection with at least one of the figures, as set forth more completely in the claims.

DETAILED DESCRIPTION

Figure 1:
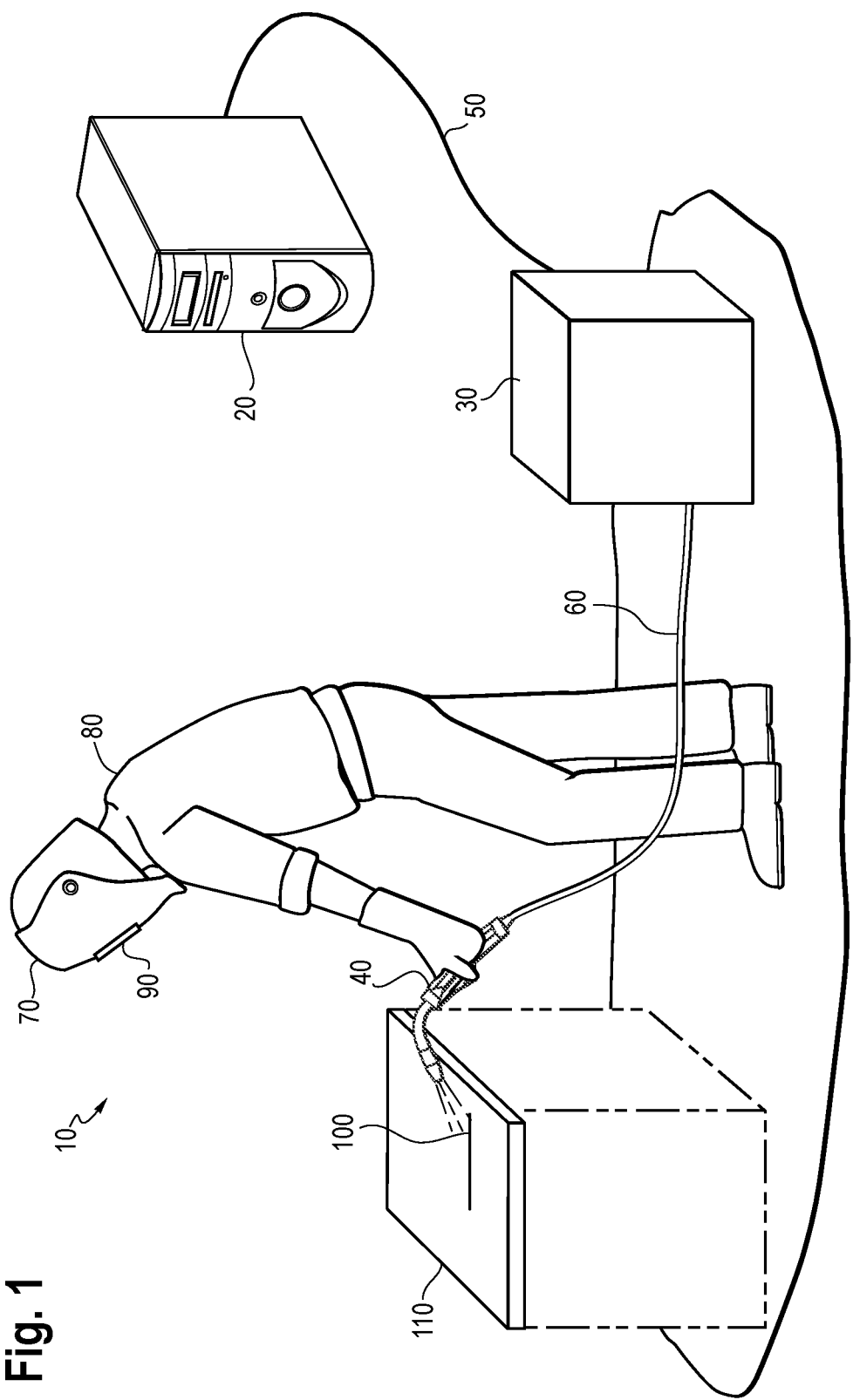
FIG. 1 shows an embodiment of a welding system according to the present disclosure.

As utilized herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Some embodiments of welding systems and methods according to the present disclosure provide a weld confidence metric represented by a number between [0-100], in which 100 provides the expectation that there is very high confidence of a good quality weld and 0 provides the expectation that there is very high confidence of a bad quality weld.

Some embodiments of welding systems and methods according to the present disclosure provide for the selection (e.g., user selection) of a representative weld of known good quality which is used as a future reference for all corresponding welds of that specific type and/or class. Some embodiments provide an algorithm which compares all future welds against the reference and computes a single metric (e.g., weld confidence) which represents the estimated quality of the weld. When a weld produces a lower confidence value, some embodiments provide information about which feature or features are responsible for the lower evaluation, which, in turn, provides useful information about potential corrective action and/or responsive solutions.

Some embodiments of welding systems and methods according to the present disclosure provide for a "learning" process which allows for the user selection of a second weld reference (e.g., a second, distinct weld reference of known good quality). Using the two references, the learning process tunes algorithm parameters to better estimate the weld confidence on future welds.

Some embodiments of welding systems and methods according to the present disclosure provide weld confidence metrics for welds. Some embodiments provide that one or more real-world weld references are selected and that weights and limits are set. Weld differences are computed for each individual feature and weld confidence feature series are then computed for each individual feature. An overall weld confidence and weighted weld confidence features are computed. A single weld confidence result for each weld is then computed. A weld confidence result, for example, on a scale from 0 to 100 is computed. By monitoring the weld confidence result, the welding system is capable of identifying potential weld fault conditions, identifying features that are contributing to the low weld confidence result, and to implement solutions (e.g., stop the welding process, modify the welding process, throw away the workpiece, etc.).

FIG. 1 shows an embodiment of a welding system 10 according to the present disclosure. The welding system 10 can include, for example, a computer 20, a power source 30 (e.g., a welding power source, a welding power supply, etc.), a welding torch 40 (e.g., a welding gun, a welding torch, a handheld welding torch, a robotic torch, a semi-automatic torch, etc.).

The computer 20 can be connected to the power source 30 through a computer cable 50 which, in turn, is connected to the welding torch 40 through a welding cable 60. The computer 20 can be located physically by the power source 30 or connected via a network to a local computer, a cloud computer, or a cloud server. In some embodiments, the computer 20 can be in wireless communication with the power source 30 and/or a headwear 70. In some embodiments, the computer 20 can be part of the power source 30. The computer 20 can be coupled to a display or other output device (not shown). The computer 20 can be configured to use a display that is part of the power source 30, the headwear 70 worn by an operator 80, the computer 20, and/or a separate display. In some embodiments, the computer 20 can be configured to use a display or present weld confidence metrics, parameters, or other related information on a display of the power source 30, a weld station, a smart phone, a tablet, a personal computer, a cloud network, a database network, etc. In some embodiments, the welding torch 40 is held by an operator 80 with the headwear 70 which can include a viewing port and/or display 90. The welding torch 40 can be configured to generate an arc through which droplets of welding material are used to form a weld on a workpiece 110. The power source 30 is also connected to the workpiece 110 through a ground cable, a negative cable, and/or a work lead (not shown).

In some embodiments, the power source 30 can be configured to house a wire spool and/or filler spool that is used to provide the welding torch 40 with welding material (e.g., metal, tungsten, etc.). In some embodiments, the power source 30 is connected to a shield gas source (not shown). The power source 30 can be configured to automatically feed the welding torch 40 with the welding material and to provide the shield gas (e.g., an inert shield gas) through the welding cable 60.

In operation according to some embodiments, the power source 30 provides current and/or voltage to a consumable electrode (e.g., tip of the feeder wire and/or material) or a nonconsumable electrode of the torch 40 to form the arc. The electrode delivers the current to the point of welding on the workpiece 110 through the arc. In the welding system 10, the operator 80 controls the location and operation of the electrode by manipulating the torch 40 and triggering the starting and stopping of the welding process.

In some embodiments, the computer 20 and/or the power source 30 monitor, analyze, control, and/or modify the pulsed welding process on a pulse-by-pulse basis. The computer 20 and/or the power source 30 can assign weld confidence metrics to weld operations under real-world conditions and/or other practical considerations. Based on the weld confidence metrics, the computer 20 and/or the power source 30 can determine whether potential weld fault conditions exist. If such weld fault conditions do exist, then information is provided about features that are causing the low weld confidence metrics. The welding process and/or system can be stopped and/or alerts, indications, messages can be transmitted, displayed, and/or heard. In some embodiments, the weld confidence metrics can be used to pinpoint problems (e.g., problems related to the features contributing to the low weld confidence metrics), to modify the weld process and/or system, and/or to train or modify behavior in the operator 80.

Figure 2:
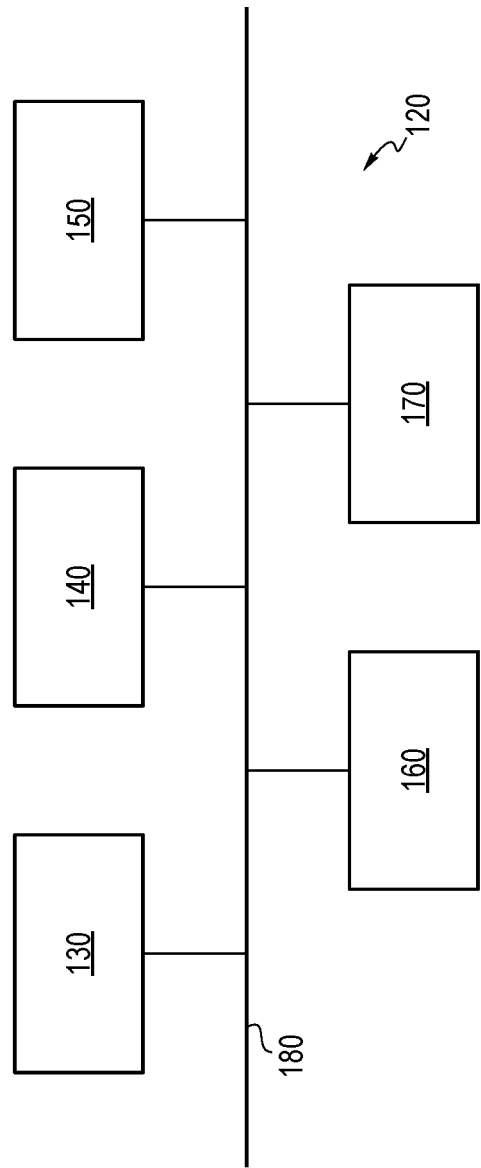
FIG. 2 shows an embodiment of a circuit arrangement according to the present disclosure.

FIG. 2 shows an embodiment of a circuit arrangement (e.g., component arrangement, device arrangement, and/or circuit arrangement) according to the present disclosure. The circuit arrangement 120 illustrated in FIG. 2 is not comprehensive and can be supplemented with other components, devices, and/or circuits as known by one of skill in the art. Further, the circuit arrangement 120 shown in FIG. 2 can be part any of the devices of the system 100. For example, each of the computer 20, the power source 30, and/or the headwear 70 can include its own respective circuit arrangement 200.

In some embodiments, the circuit arrangement 120 can include, for example, one or more processors 130, one or more memories 140 (e.g., one or more nontransitory memories), one or more communication devices 150 (e.g., wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, Lightning cable ports, cable ports, etc.), one or more input devices 160 (e.g., keyboards, mouse, touch pad, touch-sensitive screen, touch screen, pressure-sensitive screen, graphical user interface, user interfaces, buttons, microphone, etc.), and one or more output devices 170 (e.g., displays, screens, speakers, projectors, etc.). The processor 130, the memory 140, the communication device 150, the input device 160, and/or the output device 170 can be connected to one or more buses 180 or other types of communication links.

The processor 130 can include, for example, one or more of the following: a general processor, a central processing unit, a digital filter, a microprocessor, a digital processor, a digital signal processor, a microcontroller, a programmable array logic device, a complex programmable logic device, a field-programmable gate array, an application specific integrated circuit, one or more cloud or network servers operating in series or in parallel, and a memory. Code, instructions, software, firmware and/or data may be stored in the processor 130, the memory 140, or both.

The memory 140 can include, for example, one or more of the following: a non-transitory memory, a non-transitory processor readable medium, a non-transitory computer readable medium, read only memory (ROM), random access memory (RAM), non-volatile memory, dynamic RAM (DRAM), volatile memory, erasable programmable ROM (EPROM), electrically EPROM (EEPROM), ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory 140 can be configured to store code, instructions, applications, software, firmware and/or data for use by the processor 130 and may be external, internal, or both with respect to the processor 130.

In some embodiments, some of the code, instructions, applications, software, firmware and/or data can be hardwired (e.g., hardware implementations, hardwired into registers, etc.) and/or can be programmable.

In some embodiments, some or all of the steps, acts, methods, and/or processes described herein can be performed by code, software, firmware, and/or instructions, for example, that are executed by the processor 130 and stored in the memory 140 and/or the processor 130 of the computer 20, the power source 30, and/or the headwear 80. In some embodiments, the code, software, firmware, and/or instructions executed by the processor 130 of the computer 20, the power source 30, and/or the headwear 80 can configure the processor 130 to perform or cause to perform some or all of the steps, acts, methods, and/or processes described herein.

Some embodiments of the present disclosure provide a method (e.g., an algorithmic method) of detailed processing or data analysis to extract feature information (feature extraction) from the voltage and current components of a weld signature (e.g., Weld Signature®) of a weld operation.

Some embodiments of the present disclosure provide for a series of algorithms that can reside in monitoring software and that can be applied to every incoming weld acquired through the system. Some embodiments provide a method whereby the "quality" of a weld is ranked in confidence—represented by a number between 0 and 100 in which 100 is indicative of an expectation for a very high confidence of a good quality weld and in which 0 is indicative of an expectation of a very high confidence of a bad quality weld. Some embodiments provide that the resulting weld confidence metric provides a quality grade for each weld.

Figure 3:
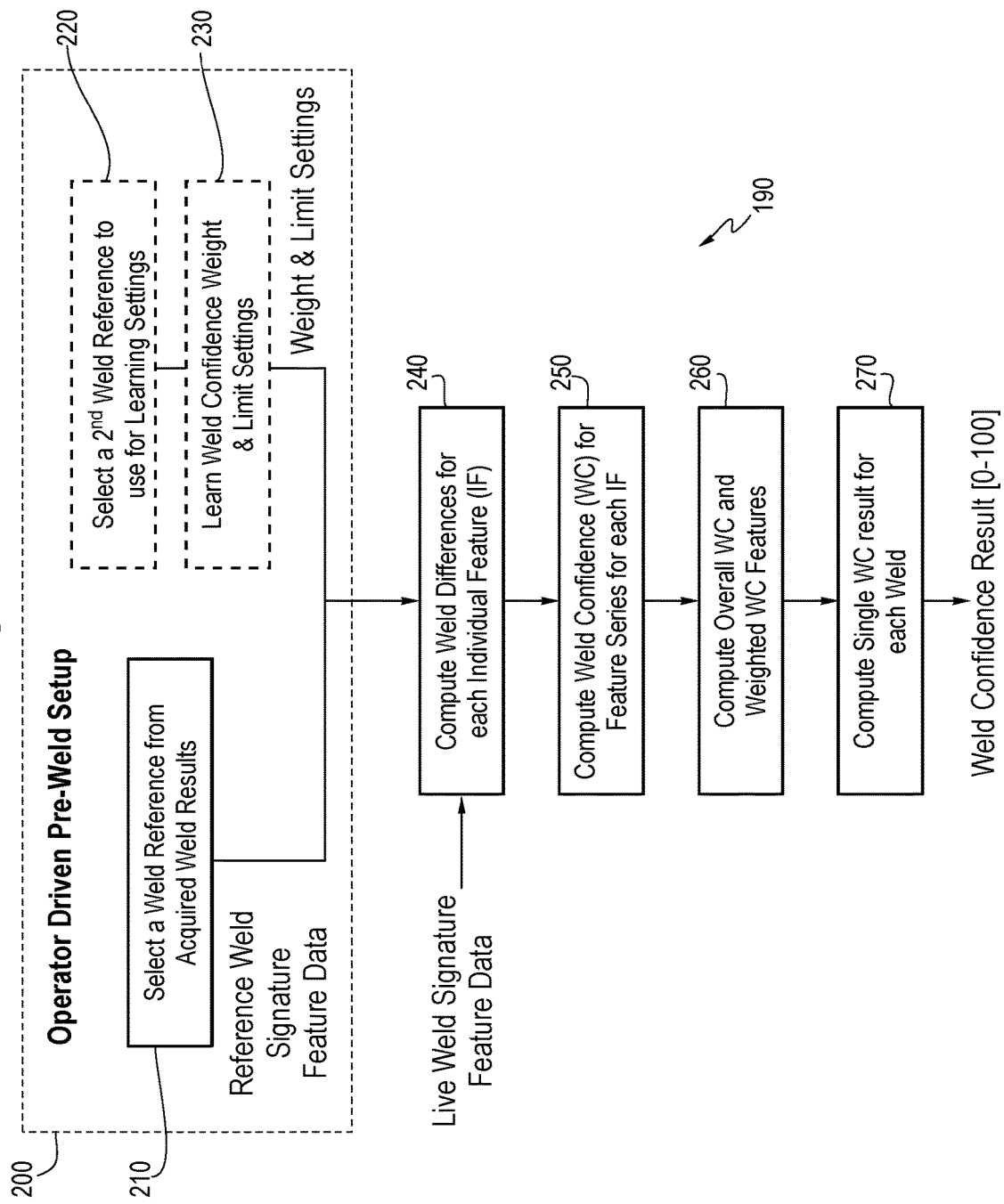
FIG. 3 shows a flow diagram of an embodiment of a weld confidence determination method according to the present disclosure.

FIG. 3 shows a flow diagram of an embodiment of a weld confidence determination method 190 according to the present disclosure. In some embodiments, the method 190 begins with a pre-weld setup process 200 (e.g., an operator driven, pre-weld setup process).

With respect to step 210 of the pre-weld setup process 200, the method 190 provides for the selection of a weld reference from previously acquired weld results. Some embodiments provide that the operator 80 or some other person selects a reference weld from previously captured data (e.g., a weld signature that can include, for example, a voltage signature (voltage v. time) and/or a current signature (ampere v time)) from an earlier, historic weld that was previously determined to be representative of a good or high quality weld. In addition to a voltage signature and/or a current signature, the reference weld can be characterized by one or more of the following: a wire speed, a gas flow, a travel speed, a temperature, a torch location, a torch angle, etc. A user of the monitoring software, for example, can select a reference weld in a number of ways (see below) from the computer 20 and/or the power source 30. Some embodiments provide for using previous good welds for the same part type and location as reference welds to improve the accuracy in tracking expected variations of a particular weld process.

In some embodiments, some or all welds from a successfully completed part can be identified as reference welds in which each reference weld can be associated with future welds located in the same location on the part. Such an approach contemplates that welds in different locations and on different parts can have different high quality weld characteristics and/or weld signatures. Thus, it can be useful to have each weld on a successfully completed part be used as references for future corresponding welds on subsequent identical parts.

In some embodiments, any historical data from individual welds can be selected to provide a reference for one or more of the welds expected to be completed in the future. Thus, for example, for a series of four welds on a particular part, the best example of a reference weld might be selected for each individual weld. The reference welds need not be on the same successful part, for example.

In some embodiments, a reference weld can be selected that represents a class or group of welds. Welds can be accurately represented in a limited set of classes or validated weld procedures and/or processes that can be particularly useful for process standardization and qualification.

Once a reference weld is selected. Data associated with the reference weld including, for example, the captured weld signature, extracted features (e.g., average voltage, pulse frequency, threshold crossing counts, averaging, statistical techniques, etc.—nominally measured at a 10 Hz rate over the duration of the weld), and/or advanced features (e.g., an instantaneous frequency, background slope, a droplet location, a droplet magnitude, pulse peak statistics, pulse background statistics, a one-droplet-per pulse quality feature, an optimal process quality feature, wavelet pulse statistics, syntactic analysis, etc.) are saved for use in performing future calculations related to estimating weld confidence.

With respect to step 220 of the pre-weld setup process 200, the method 190 provides for the selection of a second weld reference to use for learning settings. Some embodiments provide for using settings of "weights" and "limits" for each individual weld signature feature to implement the algorithm A weight is used to determine the contribution of a particular feature to the overall weld confidence metric. A limit is used to quantify what the weld confidence metric contribution at each point of the weld signature feature is. Some embodiments provide for weights and limits to focus the algorithm on particular sensitivities for particular welds in particular applications. Thus, for some welds, for example, instantaneous frequency might be given more weight than less important features such as gas, for example.

With respect to step 230 of the pre-weld setup process 200, the method 190 provides a mechanism for automated learning of weights and limits A user of the algorithm, for example, can select a second good weld (or part) as a second reference, which is compared with the first reference and is used as to compute effective limits Some embodiments provide that the two reference weld signatures can be used to tune the algorithm limit settings. If the references are very close in characteristics, features, and/or weld signatures, then the limits will effectively tighten. If the references are not very close in characteristics, features, and/or weld signatures, then the limits will effectively loosen. In some embodiments, the method includes a point-by-point difference between the corresponding individual weld signature features; an average of the absolute value of the differences across all valid points; and the implementation of this difference to set the N % (e.g., typically 90%) value for the limit. If the difference is too small, a floor value for each feature can be used instead.

With respect to step 240, during live welding operation, the method 190 computes weld differences for each individual feature based on the live weld signature feature data. In some embodiments, when live weld signature data and/or live weld signature feature data is received, each of its weld signature features are subtracted, point by point, from the corresponding weld signature features of the reference (where available), thus producing a difference feature for each weld signature feature. This produces a set of individual difference series for each feature.

With respect to step 250, the method 190 computes weld confidence feature series for each individual feature. In some embodiments, the limit for each corresponding feature is applied to each point in the difference feature to produce an individual weld confidence metric at each point in the feature for each feature, thus producing a set of individual weld confidence features for each weld signature feature. In some embodiments, if the reference signature is shorter in length than the signature being analyzed, then the global average of the reference feature is used to extend the reference feature trace to the length of the signature being analyzed. Some embodiments provide that the production of individual weld confidence features allow the user to see which feature components contributed to a low weld confidence metric, thereby allowing for the pinpointing and/or diagnosing of problems, the determining of contributing factors, the development of solutions, and/or the taking of action (e.g., stop welding process, modify welding process, communicate alert, etc.).

In some embodiments, the limit can applied in the following way. If the absolute value of a difference point is less than the limit, then the resulting weld confidence metric at that point is a linear interpolation, equal to the 100−[absolute value(Difference)/Limit*100]. If the absolute value of the difference point is larger than the limit, than the weld confidence metric at that point is 0.

With respect to step 260, the method 190 computes an overall weld confidence and weighted weld confidence features. In some embodiments, once all weld signature features—with data for both reference and recently acquired weld—are completed, there is a set of individual weld confidence features (e.g., one for each weld signature feature). All individual weld confidence features are averaged point-by-point into one feature called the overall weld confidence feature. A point-by-point, weighted average (using the aforementioned weights from 0 to 1) is also computed called the weighted overall weld Confidence feature.

With respect to step 270, the method 190 computes a single weld confidence result for each weld. In some embodiments, the singular weld confidence metric for the weld is then computed by averaging either the overall or weighted overall weld confidence feature across all valid points as pre-selected by the user. Valid points can include, for example, all points in the body of the weld, excluding, for example, a startup transient area and a weld ending transient area. The single weld confidence result is a number from 0 to 100.

Some embodiments can then use the single weld confidence result to determine whether a potential weld fault condition exists. If one exists, then the single weld confidence result can be deconstructed and the features that are contributing to the low single weld confidence result can be identified. By pinpointing the problem features, particular problems can be identified through association and particular solutions can be determined. Further, the welding process can be stopped and/or modified, for example, as a result of the low single weld confidence result.

The computer 20 and/or the power source 30 and/or the headwear 70 can provide using interfaces such as a touch sensitive display, a graphical user display, a mouse, a keyboard, buttons, etc. The algorithm which runs on one or more of the computer 20, the power source 30, and/or the headwear 70 can provide menu items to perform certain operations on individual weld signatures as disclosed below.

Some embodiments can save, in a buffer or other non-transitory memory, a particular signature being displayed, for example, as a reference. In some embodiments, while in the graphic limit editing mode, the user of the algorithm can select a specific weld signature from a data view to save for future comparison with incoming live weld data.

Some embodiments can learn weld difference limits from the signature and save to a buffer or other non-transitory memory. In some embodiments, once the user has a reference stored in the buffer, then the user can select a second weld signature and use these two references to learn a set of weld difference weights and limits to use for subsequently computing weld confidence from additional weld signatures. This function asks if the user wants to learn weights and limits for all possible features or to use only a preset list of feature weight already in the Buffer. The user can also set a target weld confidence for this function.

Some embodiments can apply the reference and weld difference limits from the buffer to this signature. In some embodiments, once a reference and a set of weld difference weights and limits are set in the buffer, then any weld signature can use them to re-compute a bottom-line weld confidence and a weld confidence and weighted weld confidence advanced feature.

Some embodiments can automatically apply the reference and the weld difference limits from the buffer. In some embodiments, a saved reference and weld difference weights and limits are automatically applied to a new signature.

Some embodiments provide for editing the list of weld difference weights and limits saved in the buffer.

In some embodiments, the algorithm that runs on one or more of the computer 20, the power source 30, and/or the headwear 70 can provide menu items to perform certain operations on a part basis as disclosed below.

Some embodiments provide for using a particular part as a reference. In some embodiments, a specific part in a part view and/or display can be selected. All valid welds in the part will be used as corresponding reference welds in the associated weld settings of the part in the associated network or device.

Some embodiments provide for using a particular part to learn weld difference weights and limits. In some embodiments, once the user of the algorithm has a references in the device settings, then the user can select a second part and use the welds of these two parts to learn weld difference weights and limits for each weld. This function asks if the user wants to learn weights and limits for all possible features or use only the preset list of feature weight already stored in the buffer. A target weld confidence can also be set for this function.

Some embodiments provide that the weld difference weights and limit settings of a particular part can be set to what is saved in the buffer. In some embodiments, the menu item takes the set of weld difference weights and limits that are set in the buffer and copies them to each weld setting in the device for the associated part.

Some embodiments provide for editing the list of weld difference weights and limits saved in the buffer.

Once the weld confidence and weighted weld confidence advanced features and results are computed, they are used to detect potential weld faults and allow the system to communicate and take corrective action.

Figure 4:
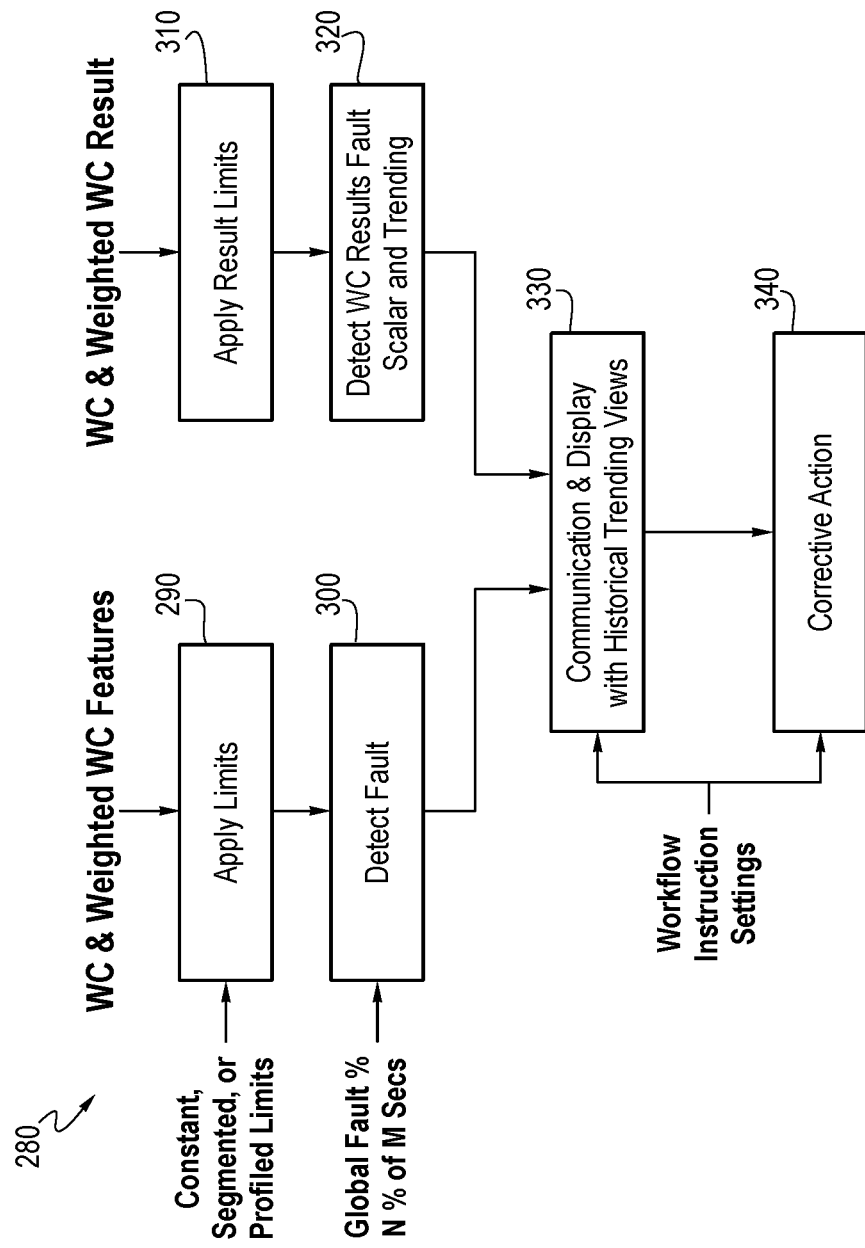
FIG. 4 shows a flow diagram of an embodiment of a fault processing method according to the present disclosure.

FIG. 4 shows how fault processing is applied to each advanced feature (weld confidence and weighted weld confidence) and to the scalar weld confidence and weighted weld confidence results.

With respect to step 290, the algorithm applies limits to each advanced feature (e.g., weld confidence and weighted weld confidence features). In some embodiments, each point of the advanced feature can be compared with an upper and lower limit Upper and lower limit exceedances can be tracked independently. In some embodiments, the limits can be preset. In some embodiments, the limits can be specific to the part and/or weld location and/or sequence on the part. Limits can be derived from a weld class—a pre-specified weld process and limit set that can govern multiple similar welds.

In some embodiments, upper and/or lower limits can be one or more of the following: a fixed limit that is the same over the duration of a weld; a segmented limit that is constant over subsets of time over the duration of the weld; and a profiled limit that is changes (e.g., changes continuously) over the duration of the weld.

In some embodiments, the limits can be manually set via tabular entry or graphical manipulation on a display. The limits can be derived from historical weld signatures via a number of manually enhanced or automated learning processes. Limits can be adaptively derived on a weld-by-weld basis from historical data.

In some embodiments, one or more sets of limits may be used in parallel to enhance fault detection.

With respect to step 300, the algorithm detects a fault based on fixed, segmented, and/or profiled limits. In some embodiments, the limit exceedance information, over the duration of the weld, is used to determine if a weld fault should be detected and/or indicated.

In some embodiments, two methods can be used (e.g., in parallel) to detect faults and/or indicate faults. In a first method, a pre-specified allowable global fault percentage can be specified for each specific weld or class of welds. The number of limit exceedances—upper and lower can be processed independently—is tabulated for the entirety of the weld. If the total exceeds the allowable global fault percentage, then a weld fault for this type (e.g., Fault Type=Upper Instantaneous Frequency) is indicated. If the duration of the weld is not pre-specified, then the weld fault is determined at the conclusion of the weld. However, if the duration of the weld is known a-priori, then the allowable fault percentage can be understood as a specific time (e.g., percentage of a specific duration setting) and a weld fault can be called during the weld if the total exceedance time exceeds that specific time.

In a second method, pre-specified settings for N and M can be specified for each specific weld or class of welds. The number of limit exceedances—upper and lower can be processed independently—is tabulated (e.g., tabulated continuously) for sets of M seconds as the weld occurs. If the exceedances of a particular M second window exceed N percent of that window, then a weld fault for this type is indicated.

In some embodiments, when a weld fault is indicated, the type of weld fault is captured and passed to the next step in the process. Multiple fault types can occur and be handled on the same weld.

With respect to step 310, the algorithm applies result limits to weld confidence and weighted weld confidence results. In some embodiments, weld confidence and weighted weld confidence results are compared with an upper and lower limit Upper and lower limit exceedances can be tracked independently. In some embodiments, the limits can be preset. In some embodiments, the limits can be specific to the part and/or weld location and/or sequence on the part. Limits can be derived from a weld class—a pre-specified weld process and limit set that can govern multiple similar welds. Upper and lower limits can be manually set via tabular entry or derived from historical weld signatures via a number of manually enhanced or automated learning processes. Limits can also be adaptively derived on a weld-by-weld basis from historical data.

With respect to step 320, the algorithm detects weld confidence results fault. In some embodiments, if a limit is exceeded, then a weld fault is indicated and its type is captured and passed to the next step in the process. Multiple fault types can occur and be handled on the same weld.

The algorithm also provides historical trending of weld confidence results for fault detection. In some embodiments, historical trending of weld confidence results from the same weld are used to detect fault conditions. A consistent downward trend can be detected via use of a negative slope detection algorithm, for example. Trending threshold limits are established, learned, and controlled in conjunction with the scalar weld confidence results limits With respect to steps 330 and 340, the algorithm communicates and/or displays detected faults with historical trending views and/or performs corrective action based on workflow instruction settings.

In some embodiments, workflow is a methodology for automatically handling synchronous and asynchronous events which occur, in the production welding process, a pre-specified way with pre-specified actions or behaviors. This methodology provides a way for the system to be pre-configured or "programmed" by the end user to achieve a highly choreographed and effective operation.

In some embodiments, synchronous workflow events are events that occur, in an expected sequence, in the operation of the production welding process or job such as, for example, one or more of the following: job load, part start, first weld, last weld, part end, etc.

In some embodiments, asynchronous workflow events are events that occur in the operation of the production welding process or job, but which occur in an unexpected sequence when compared to the synchronous workflow events such as, for example, one or more of the following: shift change, lunch break, machine downtime, supervisor log-in, etc.

In some embodiments, workflow instructions are the pre-specified operations that are desired to occur when specific events happen such as, for example, one or more of the following: send email and/or text information to a supervisor, play a video, sound an alarm, shutdown the welding machine (e.g., power supply 30), disable the manual welding torch 40, etc. These examples are but a small subset of the useful work instructions contemplated by some embodiments.

In this context (e.g., the detection of a weld fault of a specific type), pre-set workflow instructions can be set so that the system can respond uniquely to an indicated weld fault. The instructions can be set so that they are applicable to any weld fault for any weld, or so that they only apply to a specific fault type on a specific weld location of a specific part of a specific job, or to any combination in between these conditions.

In some embodiments, weld fault indications can be displayed and/or communicated in a number of ways. Faults can be consolidated such that if any fault occurs a "red light" alarm can be shown in the welding cell, on the welding machine, on a local operator display, on a fault indicator at a supervisor station, and/or on a remote display device. More specific fault information, including the type and character of the fault, can be displayed to the operator in real-time and historically through a graphical interface (e.g., a user graphical interface, a software graphical interface, a touch-sensitive graphical interface, etc.) in association with the source device, the part, the weld signature and/or weld report. Communication and display can be performed as an intrinsic part of the normal operation of the software and/or hardware of the system, or it can be caused by the execution of a specific workflow instruction that has been added to uniquely provide a desired form of communication and display.

In some embodiments, the algorithm can provide and/or display historical trending views, with fault limit indicators, are provided to help operators and users with actionable trending information about the relative quality of individual welds—over time and in reference with other welds on the part.

In some embodiments, weld fault indications can cause the system to take corrective action in a number of ways. Faults can be consolidated such that if any fault occurs, a corrective action can be taken. Corrective actions can include such operations as, for example, one or more of the following: lock the part clamping mechanism without automatically releasing a part until the part has been inspected; disable the manual welding torch until a supervisor resets the system; and/or automatically move the part into a scrap bin. More specific corrective actions, which are specific (and possibly limited) to the type and character of the fault, can be taken. Corrective action can be done as an intrinsic part of the normal operation of the software and hardware of the system, or it can be caused by the execution of a specific workflow instruction that has been added to uniquely provide a desired form of corrective action.

Some embodiments of the methods and systems described herein provide a number of advantages, some of which are discussed below.

Some embodiments provide for the use of a selected representative good weld of the same type, location, part and/or process to form a quality metric.

Some embodiments provides for detailed follow-up information when a quality metric measurement indicates a low quality weld.

Some embodiments provide for "easy button" set up. For example, by simply performing one good weld and selecting it as a reference, the algorithm is ready to operate. In another example, by simply performing one successful part with a plurality of good welds and selecting the successful part as a reference, the algorithm is ready to operate.

Some embodiments provide for an automated learning process to tune algorithm parameters when a second weld reference is selected.

Some embodiments provide for the use of multiple selected reference signatures to gain statistical perspective and stability in the estimation of weld confidence.

Some embodiments provide for the use of an adaptive learning process that considers all welds of matching type, location, and part type as they are performed to enhance the estimation of weld confidence.

Some embodiments provide for the use of fuzzy logic methodology to enhance the estimation quality, to improve the diagnostics information that is produced with a poor weld confidence result, and to apply expert domain knowledge to the quality algorithm.

Some embodiments provide that the determination of the weld confidence can be performed by the power source 30, the computer 20, or some combination thereof. Some embodiments provide that the determination of the weld confidence can be performed by one or more processors that reside in one or more of the following: the power source 30, the computer 20, a cloud network, a laptop, a smart phone, a tablet, etc.

Some embodiments provide that a received weld signature associated with a weld can be compared with one or more weld references from one or more earlier performed welds. In some embodiments, the one or more weld references can include high quality welds. In some embodiments, the one or more weld references can include low quality welds (e.g., poor quality welds). In some embodiments, the one or more weld reference can include both high quality welds and low quality welds.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A welding system, comprising:
one or more non-transitory memories; and
one or more processors operatively coupled to the one or more non-transitory memories, wherein the one or more processors are configured to:
save a first weld signature associated with a first performed weld,
select the first weld signature as a first reference weld,
save a second weld signature from a second performed weld,
compare the second weld signature associated with the second performed weld with the first reference weld, wherein at least one of the first weld signature or the second weld signature includes a voltage signature, and
determine a single weld confidence result for the second performed weld based on the comparison.

2. The welding system according to claim 1, wherein the one or more processors are configured to trigger a weld fault condition based on the single weld confidence result.

3. The welding system according to claim 2, wherein the one or more processors are configured to stop or to modify the welding by the welding system when the weld fault condition is triggered.

4. The welding system according to claim 1, wherein the one or more processors are configured to trigger an alarm, to send an alarm message, or to send a text communication when the weld fault condition is triggered.

5. The welding system according to claim 1, wherein the one or more processors are configured to identify which individual features of the second weld signature are causing a low single weld confidence result.

6. The welding system according to claim 5, wherein the one or more processors are configured to provide possible problems associated with the identified individual features of the second weld signature that are causing the low single weld confidence result, and wherein the one or more processors are configured to provide solutions associated with the possible problems.

7. The welding system according to claim 1, wherein the voltage signature comprises a profile of voltage over time during the first performed weld or the second performed weld.

8. The welding system according to claim 1, wherein the one or more processors are configured to store, in a buffer or a non-transitory memory, the first weld signature as the reference signature.

9. The welding system according to claim 1, further comprising an interface configured to receive an input to select the first weld signature as the reference signature.

10. The welding system according to claim 1, wherein at least one of the first weld signature or the second weld signature include a current signature.

11. The welding system according to claim 10, wherein the current signature comprises a profile of current over time during the first performed weld or the second performed weld.

12. The welding system according to claim 1, wherein the single weld confidence result comprises an average of multiple weld confidence results.

13. A welding system, comprising:
one or more non-transitory memories; and
one or more processors operatively coupled to the one or more non-transitory memories, wherein the one or more processors are configured to:
save a first weld signature associated with a first performed weld,
select the first weld signature as a first reference weld,
save a second weld signature from a second performed weld,
compare the second weld signature associated with the second performed weld with the first reference weld, wherein at least one of the first weld signature or the second weld signature include a current signature, and
determine a single weld confidence result for the second performed weld based on the comparison.

14. The welding system according to claim 13, wherein the current signature comprises a profile of current over time during the first performed weld or the second performed weld.

15. The welding system according to claim 13, wherein at least one of the first weld signature or the second weld signature includes a voltage signature.

16. The welding system according to claim 15, wherein the voltage signature comprises a profile of voltage over time during the first performed weld or the second performed weld.

17. The welding system according to claim 13, wherein the single weld confidence result comprises an average of multiple weld confidence results.

18. A welding system, comprising:
one or more non-transitory memories; and
one or more processors operatively coupled to the one or more non-transitory memories, wherein the one or more processors are configured to:
save a first weld signature associated with a first performed weld,
select the first weld signature as a first reference weld,
save a second weld signature from a second performed weld,
compare the second weld signature associated with the second performed weld with the first reference weld, and
determine a single weld confidence result for the second performed weld based on the comparison, wherein the single weld confidence result comprises an average of multiple weld confidence results.

19. The welding system according to claim 18, wherein at least one of the first weld signature or the second weld signature include a current signature.

20. The welding system according to claim 19, wherein the current signature comprises a profile of current over time during the first performed weld or the second performed weld.

21. The welding system according to claim 18, wherein at least one of the first weld signature or the second weld signature includes a voltage signature.

22. The welding system according to claim 21, wherein the voltage signature comprises a profile of voltage over time during the first performed weld or the second performed weld.

* * * * *